United States Patent [19]
Horn

[11] 3,879,058
[45] Apr. 22, 1975

[54] SPARE WHEEL ASSEMBLY FOR TRAILERS

[76] Inventor: Elmer H. Horn, 799 N.W. 98th St., Miami, Fla. 33150

[22] Filed: June 28, 1974

[21] Appl. No.: 484,456

[52] U.S. Cl. ......... 280/150 A; 214/454; 280/150 P; 280/150.5
[51] Int. Cl. ............................................. B60s 9/22
[58] Field of Search ........... 214/451, 452, 453, 454; 280/150 A, 150 P, 150.5; 180/24.02

[56] References Cited
UNITED STATES PATENTS
2,399,207  4/1946  Clark .................................. 214/453
2,478,653  8/1949  Callan ............................. 280/150 A

*Primary Examiner*—Albert J. Makay

[57] ABSTRACT

A spare wheel assembly unit adapted to be attached to a trailer provides a wheel to be swung from beneath the frame of the trailer to a position adjacent either ground engaging wheels of the trailer that have been punctured. The unit consists of a cross member with end plates secured at the ends thereof, the end plates being secured to the frame of the trailer in proximity of the wheels. The spare wheel is mounted on the end of an axle that is pivoted to the cross member and normally secured by a bracket between the frame of the trailer out of contact with the ground. Upon one of the wheels becoming disabled, the axle and spare wheel are swung in the direction of that wheel to a position adjacent the wheel and locked to the end plate to support the trailer.

4 Claims, 2 Drawing Figures

3,879,058

SPARE WHEEL ASSEMBLY FOR TRAILERS

BACKGROUND OF THE INVENTION

1. Field Of The Invention

This invention relates to trailers and is more particularly directed to a spare wheel assembly for trailers as an emergency substitute for a wheel that has become punctured or otherwise disabled.

2. Description Of The Prior Art

It is the practise of most trailers to carry a spare wheel bolted to the frame of the trailer. When a wheel becomes punctured, the trailer has to be jacked up and the punctured wheel removed and replaced by the spare wheel. This procedure is, of course, time consuming as well as being arduous. Attempts have been made to avoid the having to replace the disabled wheel at the time the wheel is punctured or otherwise disabled by providing a spare wheel normally carried by the trailer in its non-operating position and shifted to ground engaging position in proximity of the disabled wheel to permit the operation of the trailer.

However, these spare wheel devices are usually cumbersome and not readily shiftable from its non-use to its ground engaging position. Most of these require tools to shift the spare wheel from one position to the other. Also, most of these spare wheels are not the same size as the disabled wheel, but are small and are intended only to permit the movement of the trailer short distances and at slow speeds. The present invention contemplates avoiding these objections to the conventional spare wheel devices for trailers.

SUMMARY OF THE INVENTION

Therefore, a principal object of the present invention is to provide a spare wheel assembly unit which can be attached to a trailer that will permit the ready positioning of the spare wheel adjacent to the disabled wheel by merely swinging the spare wheel from its position beneath the frame of the trailer to either side of the trailer to its ground engaging position to support the trailer.

Another object of the present invention is to provide a spare wheel assembly having a spare wheel of the same size as the wheels of the trailer mounted on the end of an axle that is pivoted at its other end to the trailer frame and secured out of contact with the ground whereby upon pivoting the axle and swinging the spare wheel adjacent the disabled wheel, the trailer may be made operative to the same extent as prior to the trailer wheel becoming disabled.

A further object of the present invention is to provide a spare wheel assembly for a trailer whereby upon one of the wheels of the trailer becoming disabled, the spare wheel can be substituted immediately and easily for the disabled wheel for supporting the trailer without the need of tools.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 2:
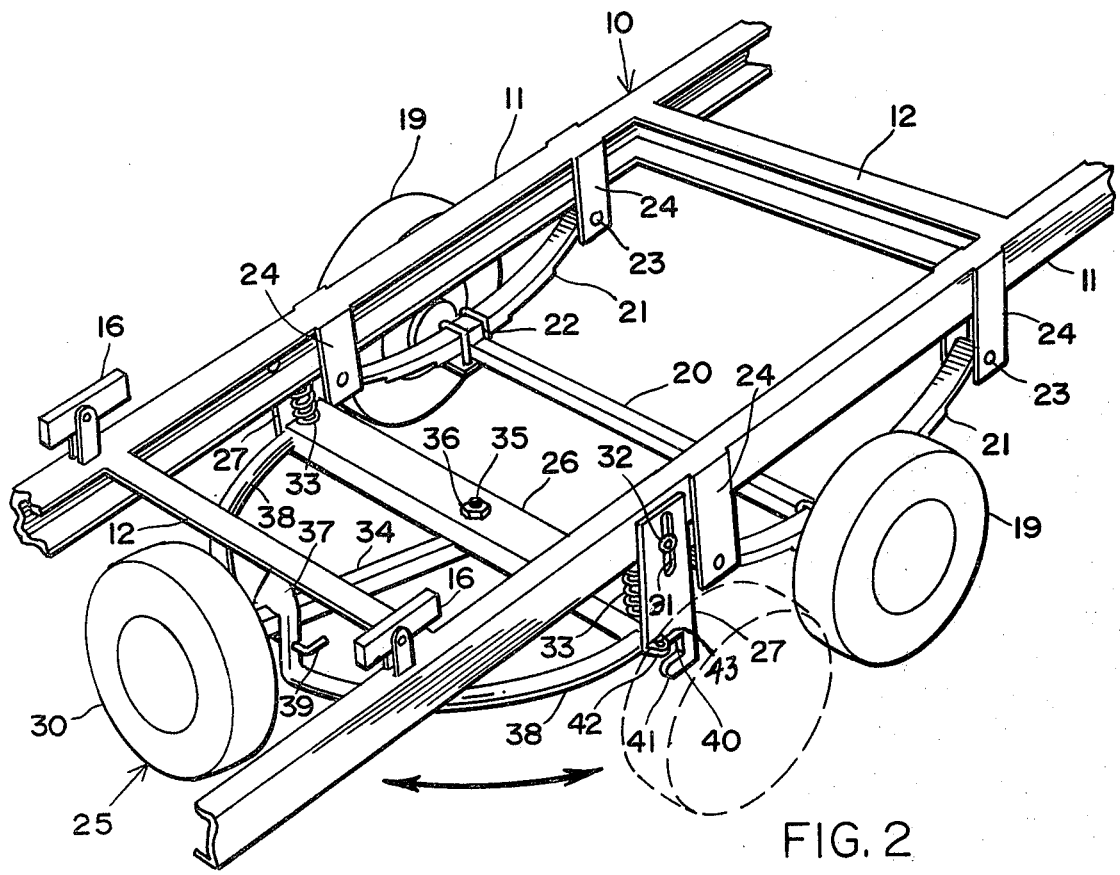
FIG. 2 is a perspective and enlarged view of the trailer (only in part) showing the details of my spare wheel assembly unit.
Figure 1:
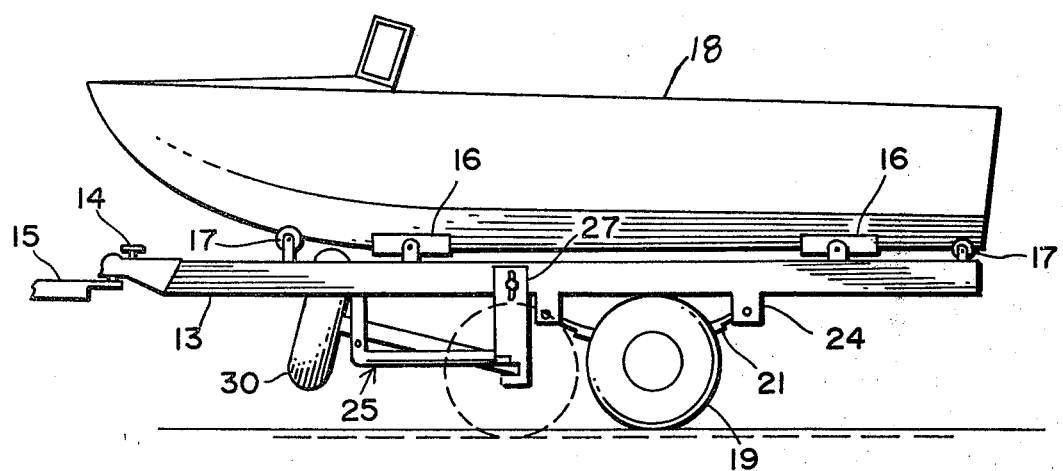
FIG. 1 is a side elevational view of a trailer having a spare wheel assembly unit constructed in accordance with my invention attached thereon.

Referring to the drawing wherein like numerals are used to designate similar parts throughout the several views, the numeral 10 refers to a conventional boat trailer to which I have attached my spare wheel assembly unit 25. The trailer 10 which is shown here for the purpose of illustration only, since my unit 25 may be attached to any conventional trailer, consists of a pair of longitudinal frame members 11 connected together by a plurality of cross members 12 with a draw bar 13 projecting from the forward end of the frame members 11. The draw bar 13 is provided with a coupling member 14 by means of which the trailer 10 is connected to a hitch 15 mounted on the bumper of an automobile (not shown).

The trailer 10 is provided with conventional supports and rollers 16 and 17 respectively for receiving and supporting a boat 18 thereon. At approximately the mid-portion of the trailer 10, are a pair of ground engaging tire mounted wheels 19 rotatably mounted on the ends of an axle 20. The axle 20 is secured to the mid-portion of each of a pair of leaf springs 21 as at 22. The ends of the leaf springs 21 are fastened by bolts 23 to the lower portion of the plates 24 whose upper end is welded or otherwise secured to the frame members 11.

To the above described boat trailer 10 which is otherwise conventional in construction, I have attached my spare wheel assembly unit 25 which consists of an axle supporting cross member 26 mounted in proximity of the axle 20. The ends of the cross member 26 is provided with end plates 27 that engage the outer surfaces of the longitudinal frame members 11. To permit the extra wheel 30 shock absorbing ability in the same manner as the wheels 19, the end plates 27 are provided with an elongated bore 31 in which a bolt 32 is fastened into the longitudinal members 11. Interposed between the ends of the cross member 26 and the lower surface of the longitudinal members 11 is a spring member 33 that permits the shock absorbing oscillations of the spare wheel 30.

The spare wheel 30 is rotatably mounted on the end of an axle 34 whose other end is bent upwardly as at 35 and received through a bore in the center of the cross member 26 where the latter is rotatably secured therein by a nut 36 threadedly mounted on the end 35 of the axle 34.

The spare wheel 30 is normally maintained elevated out of contact with the ground between longitudinal members 11 by means of a bracket 37 that is secured to and depends from the cross member 12. The bracket 37 is formed in a U-shape with its legs connected to a bar 38 formed in an arc of a circle that terminate at the ends of cross member 26 where they are fastened as by welding. The axle 34 is held in a secure position by the bracket 37 by a lock pin 39 that extends cross the legs of the bracket 37 to support the axle 34.

When the spare tire 30 is in its ground engaging position, the axle 34 will be received by an open slot 40 formed in each of the end plates 27. The slot 40 forms a ledge or lip 41 on which the axle 34 rests and is locked in position wherein by the lock pin 39 that has been removed from the bracket 37 and inserted into a threaded bore 43 formed in a tab 42 that extends horizontally from the end plates 27 at the upper portion of the slot 40.

Normally the spare wheel 30 of my spare wheel assembly 25 is maintained in its stored position as shown by the solid lines in the drawing. The spare wheel 30 is supported between the frame members 11 at the forward portion of the trailer 10 with the axle 34 being supported in the bracket 37 by the lock pin 39.

When one of the tires 19 becomes flat, all that need be done to be able to continue to pull the trailer to a place where it would be more convenient to replace or repair the punctured tire, is to remove the lock pin 39 from the bracket 37 and swing the wheel 30 about its pivot 35 toward the disabled wheel 19 and the axle 34 is forced into the slot 40 by drawing the trailer 10 forwardly as the spare wheel 30 engages the ground. The trailer 10 is now supported by the spare wheel 30 as indicated by the dotted line positions in the drawing and the disabled tire 19 is lifted off the ground. The spare wheel 30 is now locked in the slot 40 of the support plate 27 by the lock pin 39 being threaded into the bore 42 to close off the opening of the slot 40.

It is to be noted that spare wheel assembly 25 may be manufactured as a unit and mounted on any of the conventional trailers either as a part of the original construction of the trailer 10 or attached to an existing trailer. Although, the drawing shows a trailer having only two wheels, my spare wheel assembly may be used on trailers having more than two wheels such as those large trailers with tandem wheels.

What I claim as new and desire to secure by Letters Patent is:

1. A spare wheel assembly unit for a trailer comprising a pair of vertically disposed end plates, a cross member extending between said end plates, a spare wheel, an axle connected at one end to said spare wheel, means pivotally mounting the other end of said axle to the center of said cross member, bracket means securing said axle and said wheel at a mid-position between said end plates and locking means securing said axle to said end plates upon swinging said axle about said pivot means whereby when the spare tire and axle are swung laterally about said pivot means to either side adjacent a main wheel assembly it can be operatively used as an auxiliary wheel assembly to support the trailer in the case of a flat tire or other damage to a main wheel assembly.

2. The structure as recited in claim 1 taken in combination with an open slot formed in said end plates for receiving said axle at said locking means.

3. The structure as recited in claim 2 wherein said bracket means comprises a U-shaped member having leg portions extending downwardly and a removable pin extending across said leg portions for supporting said axle in said bracket means.

4. The structure as recited in claim 3 taken in combination with a trailer having a pair of longitudinal members and ground engaging wheels supporting said trailer, said cross member extending between said longitudinal members in proximity of said wheels, said end plates each having an elongated opening, a fastening member extending through said elongated openings and into said longitudinal members permitting the vertical movement of said cross member and said end plates and spring means mounted between said cross member and each of said longitudinal members.

* * * * *